United States Patent [19]

Kaiser et al.

[11] 4,143,567

[45] Mar. 13, 1979

[54] APPARATUS FOR KEEPING OPEN THE GAP CUT BY A SAW IN A WORKPIECE

[75] Inventors: Gerhard Kaiser, Metzingen; Erich Spieth, Gomaringen, both of Fed. Rep. of Germany

[73] Assignee: Gustav Wagner Maschinenfabrik, Reutlingen, Fed. Rep. of Germany

[21] Appl. No.: 832,746

[22] Filed: Sep. 12, 1977

[30] Foreign Application Priority Data

Sep. 14, 1976 [DE] Fed. Rep. of Germany ....... 2641255

[51] Int. Cl.² .......................... B26D 7/08; B26D 7/12
[52] U.S. Cl. ......................................... 83/113; 83/107; 83/175; 83/176; 83/118; 83/27
[58] Field of Search ................... 83/27, 175, 113, 107, 83/102, 176, 118

[56] References Cited

U.S. PATENT DOCUMENTS

| | | | |
|---|---|---|---|
| 3,170,349 | 2/1965 | Weinkle | 83/175 X |
| 3,709,075 | 1/1973 | Goellner | 83/107 X |
| 3,752,023 | 8/1973 | Allison et al. | 83/113 X |
| 3,978,747 | 9/1976 | Lyon | 83/175 X |

Primary Examiner—Donald R. Schran
Attorney, Agent, or Firm—W. G. Fasse; D. F. Gould

[57] ABSTRACT

A saw, especially a circular metal saw, is equipped with a device for keeping open the gap cut by the saw blade. For this purpose two chucking members are arranged symmetrically to the right and left of the saw blade on one side of the workpiece and an abutment member is arranged on the opposite side of the workpiece and opposite the saw blade. Power drive means press the chucking members against the workpiece. The workpiece engaging elements of the chucking members may be pointed ridges or conical tips.

12 Claims, 2 Drawing Figures

APPARATUS FOR KEEPING OPEN THE GAP CUT BY A SAW IN A WORKPIECE

BACKGROUND OF THE INVENTION

The present invention relates to an apparatus for keeping the gap cut by a saw in a workpiece open. More specifically, the invention is directed to metal saws, particularly circular saws for steel and non-ferrous metals such as brass, copper and aluminum. Especially in connection with the non-ferrous metals it happens frequently that the width of the gap or kerf cut by the saw blade decreases as the cutting depth increases thereby clamping the saw blade between the two workpiece portions. This happens as soon as the saw blade has penetrated sufficiently into the workpiece to be cut or when the saw blade has left an open gap behind it, as viewed in the feed advance direction. A similar decrease in the gap width occurs when cutting steel, for example, sectional steel beams, though not as frequently as in connection with non-ferrous metals. This reduction in the gap width is due to the fact that tension forces are freed as the cutting advances, thereby clamping the saw blade possibly to such an extent that the clamping force may become larger than the driving force of the sawing machine, thereby completely blocking the saw blade from further feed advance into the workpiece.

Heretofore, it was customary to free the saw blade by driving wedges into the open section of the sawed gap in order to free the saw blade when such a clamping action occurred. However, it is not always practical to place such wedges.

It is further known to make several cuts adjacent to each other, especially at the end of a workpiece because the clamping tension is even more effective at the ends of a block to be cut. Such several cuts penetrate the workpiece to different depths and are arranged at random spacings from each other, whereby each further cut penetrates deeper and deeper into the workpiece, thereby releasing the tension forces in the workpiece so that the saw blade would not be hindered in performing the final intended cut. Both of the just described prior art methods of avoiding the wedging of the saw blade are time consuming and in the last described approach, substantial material is wasted.

It has also been attempted to solve the problem by means of very sturdy vertical or horizontal clamping devices providing such high clamping powers that a narrowing of the gap made by the saw blade was substantially eliminated. However, here again due to the play of the movable parts and due to their springiness or elasticity a diminishing of the sawed gap width could not be avoided with certainty.

The most effective remedy heretofore, for example, in connection with sawing operations employing circular saw blades having inserted teeth, was to allow the teeth of the saw blade to alternately extend laterally out of the plane defined by the saw blade to one and to the other side and to further shape the teeth to taper radially inwardly from the outer end or tip of the teeth toward the body of the saw blade. Due to this structure of the saw blade, or rather of the teeth of the blade, the width of the cut gap became so large that the circular saw blade was not clamped any more. However, the disadvantage of this approach is seen in that the large width of the sawing gap results in a correspondingly high waste of material for each cut.

Furthermore, there are saw blades available the teeth of which are so constructed that they make a radial and tangential shearing cut so that the saw blade frees itself by its own cutting action in the lateral direction. These blade work excellently but it is difficult to produce them and therefore they are very expensive.

OBJECTS OF THE INVENTION

In view of the foregoing, it is the aim of the invention to achieve the following objects, singly or in combination:

to provide an apparatus for keeping open the gap being sawed into a workpiece so as to prevent the clamping of the saw blade, by simple and effective means, especially in connection with a sawing machine for non-ferrous metals and steel;

to provide a rear fixed abutment member or chucking jaw as well as two front chucking jaws movable in guide means in response to respective power drive means such as hydraulic piston cylinders to move and press the movable jaws against the fixed jaw;

to arrange the narrow clamping jaws to the right and left of the saw blade, especially where circular saw blades are involved;

to save time and material by avoiding unnecessarily wide sawing gaps and by avoiding the insertion of wedges into the sawed gap behind the saw blade; and to counter act the tension forces released as a result of the sawing operation in such a manner that a narrowing of the gap being sawed is prevented.

SUMMARY OF THE INVENTION

According to the invention, there is provided an apparatus for keeping open the gap cut by a saw in a workpiece by means of a fixed rear clamping jaw or abutment member and two front clamping jaws arranged opposite the rear abutment member. Each front clamping jaw which is arranged to the right and left of the saw blade is provided at its work engaging front face with edges or conical points. Further, the front clamping jaws are displaced laterally relative to each other in a slidable manner and against the force of strong biasing springs.

Preferably, the work engaging edges or ridges or conical tips form two work engaging lines spaced from each other by a predetermined spacing and the rear abutment member or clamping jaw has a width which is smaller than said predetermined spacing between the lines defined by said work engaging ridges or points of the two front clamping jaws.

According to a further preferred embodiment each of the two front clamping jaws has a supporting body with a slanting surface. The slant angle extends relative to the plane defined by the sawing blade in a range between 45° and 75°, preferably less than 60° relative to the plane defined by the saw blade. Thus, the two slanted surfaces of the support body form a gable roof the ridge of which faces the workpiece and the saw blade extends through such ridge. In each of the two slanted surfaces there is provided a groove, for example, having a T-cross sectional area. Although the groove is located in a surface which is slanted relative to the plane of the saw blade, the angle between the longitudinal direction of the groove and the plane of the saw blade is preferably a right angle. Support blocks which support the workpiece engaging front ends of the chucking jaws are received in such grooves. These front ends are provided with surfaces extending perpendicularly to the direction of pressure application and substantially in parallel to the side of the workpiece. The support blocks may form a negative gable roof and the workpiece engaging surfaces are each provided with a single relatively sharp ridge or edge or with a plurality of points arranged in a line for engaging the side of the workpiece. Furthermore, strong springs inserted in said guide grooves make sure that the slidable or movable front ends of the clamping jaws cannot yield laterally at the beginning of the clamping action for proper engagement of the workpiece. Further, when the clamping force is released, the springs assure that the work engaging front ends of the clamping jaws return into their starting position.

BRIEF FIGURE DESCRIPTION

In order that the invention may be clearly understood, it will now be described, by way of example, with reference to the accompanying drawings, wherein:

FIG. 1 shows a schematic illustration of a top plan view of the present apparatus wherein a portion of the workpiece such as a metal block is clamped between the clamping jaws and the saw blade has partially penetrated into the workpiece, the hydraulically operated clamping jaws are arranged on both sides of the saw blades such as a circular saw blade; and FIG. 2 illustrates a sectional view along the section line II — II in FIG. 1.

DETAILED DESCRIPTION OF PREFERRED EXAMPLE EMBODIMENTS

Figure 1:
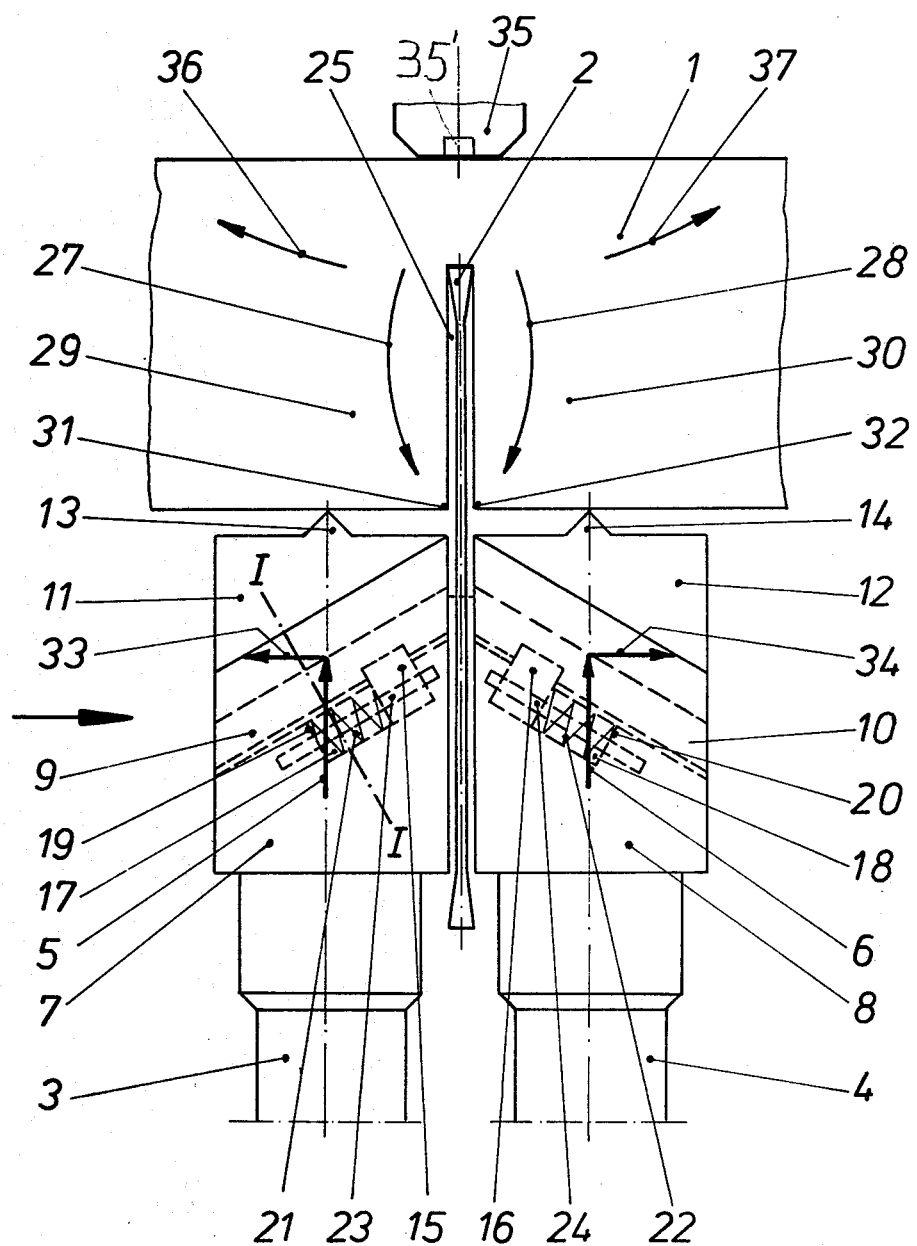
Figure 2:
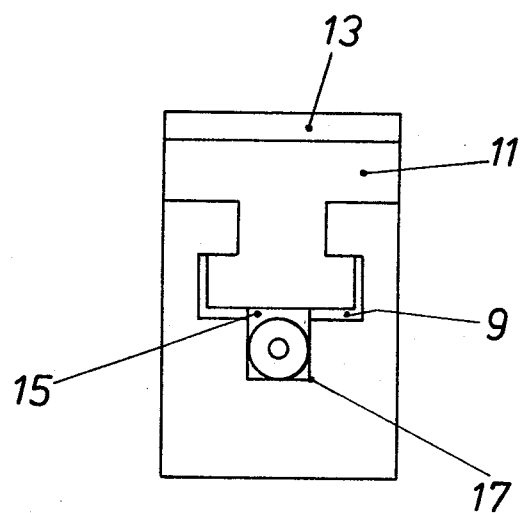

FIG. 1 shows the workpiece block 1 to be cut butting against the abutment member or rear clamping jaw 35. To the right and left of the circular saw blade there are arranged first and second clamping means 7 and 8 supported in respective guide means for movement in the direction of the arrows 5 and 6, respectively. The guide means for the first and second clamping jaws are not shown for simplicity's sake. However, these clamping jaws are powered by piston cylinder means such as hydraulic piston drives 3 and 4. The lower portions or support members 7 and 8 have a slanted surface facing toward the workpiece 1. The angle of slant relative to the plane defined by the saw blade and in the plane of the drawing is preferably less than 60° but may be within the range of 45° to 75° moreorless. The slanted surfaces form together a gabled roof and the saw blade 2 extends through the ridge of the gabled roof. Each slanted surface has machined therein a T-groove 9 or 10 (FIG. 2). The work engaging chucking elements 11 and 12 are supported for gliding movement in the grooves 9 and 10. The workpiece engaging members 11 and 12 of the clamping or chucking means have on their surfaces facing the workpiece 1 gripping ridges or edges 13 and 14 tapering toward the workpiece and pressing into the workpiece 1 in response to the pressure applied by the piston cylinder means 3, 4. Pressure blocks 15 and 16 as shown in FIG. 2 are secured to the upper clamping jaw members 11 and 12, for example, by means of screws not shown. These pressure blocks fit into milled slots 17 and 18 of the corresponding clamping jaw support or lower members 7 and 8. Between the pressure blocks 15 and 16 and the respective contact surfaces 19 and 20 of the milled slots 17 and 18, there are arranged strong or hard springs 21 and 22 held in place by a respective thorn 23 and 24. These springs 21 and 22 bias the lower members of the clamping chucks 7 and 8 into their normal position. Thus, when these members 7 and 8 move back when the clamping apparatus is opened, the springs 21 and 22 press the upper members 11 and 12 into their starting position.

When the circular saw blade 2 has cut deep enough into the workpiece 1 to form the gap 25 to a sufficient depth, the released tension forces result in a clamping force tending to tilt the two workpiece portions 29 and 30 in the direction of the arrows 27 and 28, thereby narrowing the gap 25 at its entrance points 31 and 32. Such a narrowing of the gap 25 is, however, only possible if the workpiece portions 29 and 30 can tilt against the force exerted at the force engaging ridges 13 and 14, that is, if the workpiece portions could tilt toward the saw blade 2. However, such tilting motion is avoided according to the invention due to the relatively deep penetration of the ridges 13 and 14 into the workpiece portions 29 and 30. Thus, the bending moment indicated by the arrows 27 and 28 cannot become effective in pushing the ridges 13 and 14 and thus the clamping members inwardly toward the saw blade 2. Such entraining of the clamping upper portions or members 11 and 12 would be possible only if the members 11 and 12 could travel upwardly along the respective T-grooves 9 and 10 without the ridges 13 and 14, thereby penetrating deeper into the workpiece portions 29 and 30. However, the arrangement according to the invention is such, that said travelling is prevented due to the penetration by the ridges 13 and 14 into the workpiece surface. Another possibility of the moments 27 and 28 becoming effective would be a yielding of the piston cylinder means 3, 4. However, again the arrangement of the invention is such, that such yielding is prevented.

For the above purpose the pressing action of the hydraulic piston drive means 3 and 4 on the lower support members of the clamping means 7 and 8 are such that the clamping means are pressed against the block 1 to the extent that all play between the elements involved and also all spring yielding of such elements including that of the workpiece portions 29 and 30 between the clamping upper members 11 and 12 is eliminated. Further, taking into account that the ridges 13 and 14 have penetrated into the workpiece surface portions 29 and 30 in a force locking manner, the pressure forces of the hydraulic piston cylinder means 3 and 4 represented by the arrows 5 and 33 or 6 and 34 forming respective force triangles, will be at least twice as large as the maximal occurring clamping forces 27 and 28 of the workpiece portions 29 and 30. Further, taking into account the powerful springs 21 and 22, the sum total of the forces effective to prevent the closing of the gap 25, that is, the forces opposing the forces 27 and 28, will be at least three times as large as the maximum forces 27 and 28 of the workpiece portions 29 and 30 that may occur.

The width of the abutment member or fixed clamping jaw 35 in the plane of the drawing was selected to be narrower than the spacing, again in the plane of the drawing, between the ridges 13 and 14, thereby permitting a trouble-free tilting of the workpiece portions 29 and 30 in the direction of the arrows 36 and 37, and thereby additionally providing a lever action of the movable clamping jaws. Incidentally, the stationary abutment member 35 may be provided with a recess 35' of sufficient size to accommodate the saw blade 2 when the latter completely cuts through the workpiece.

In operation the two movable parts of the clamping or chucking device on the right and left side of the blade 2 which, for example, may be a circular saw blade, are moved up to and pressed against the workpiece block 1 to be cut. The rear side of the workpiece rests against the stationary abutment or clamping member 35 having a supporting width in contact with the workpiece substantially smaller than the spacing between the ridges 13 and 14 as mentioned above. These ridges 13 and 14 bite into the workpiece surface due to their above described construction, whereby these jaws are prevented from a lateral yielding due to the strong springs 21 and 22. If the blade has cut a respectively long gap into the workpiece 1 and if the above described clamping forces 27 and 28 are freed, they nevertheless cannot make the gap narrower because the forces resulting from the clamping power effective through the slanting roof portions on the front clamping members 11 and 12 tend to move the clamping members 11 and 12 laterally apart to the right and left, thereby also forcing the workpiece portions 29 and 20 apart in the direction of the arrows 36 and 37 due to the gripping action of the ridges or points 13 and 14. For this purpose the hydraulic forces of the piston cylinder arrangements 3 and 4 are selected so large that the forces effective on the front clamping members 11 and 12 and indicated by the arrows 33 and 34 are sufficiently large to balance the clamping forces in the workpiece portions 29 and 30. Preferably, these forces exerted by the clamping mechanism are larger than the forces 27, 28 so that the two workpiece portions 29 and 30 are pressed apart in the sense to increase the width of the gap 25 to an increasing extent as the saw blade continues to penetrate into the workpiece.

Although the invention has been described with reference to specific example embodiments, it will be appreciated, that it is intended, to cover all modifications and equivalents within the scope of the appended claims.

What is claimed is:

1. An apparatus for keeping open the gap (25) cut in a workpiece (1) having a substantial thickness in the cutting direction, by a saw blade forming said gap in the workpiece, comprising fixed abutment means (35) arranged on one side of a workpiece, said fixed abutment means being substantially centrally aligned with said saw blade, first chucking means arranged substantially opposite said fixed abutment means and spaced to one side of said saw blade, second chucking means (12) also arranged substantially opposite said fixed abutment means and laterally spaced from said first chucking means on the other side of said saw blade to form a saw blade gap between the first and second chucking means, respective guide means operatively supporting said first and second chucking means for gliding movement, power drive means operatively connected to said first and second chucking means for advancing and pressing said first and second chucking means toward said abutment means, each of said first and second chucking means comprising a workpiece facing side and workpiece penetrating means on said workpiece facing side, said apparatus further comprising spring means operatively connected to said first and second chucking means for biasing the respective chucking means against said lateral gliding movement, said workpiece penetrating means biting into the workpiece surface in such a manner that lateral travelling of the first and second chucking means is substantially prevented, whereby said workpiece is clamped substantially in a three point fashion, one point being formed by said abutment means and the other two points being formed by said workpiece penetrating means whereby forces applied to the workpiece by said first and second chucking means keep said sawing gap open.

2. The apparatus of claim 1, wherein said workpiece means comprise workpiece penetrating ridges.

3. The apparatus of claim 1, wherein said workpiece means have workpiece penetrating points or tips.

4. The apparatus of claim 1, wherein each of said first and second chucking means comprises a support body and a workpiece engaging member, each support body having a surface slanting relative to the plane defined by said saw blade gap whereby the slanting surfaces form a roof having a ridge so positioned that the saw blade gap extends through said ridge, each slanting surface having guide groove menas therein, one end of which is closed, each workpiece engaging member having a guide foot arranged to slide in its respective guide groove, and spring means in each groove operatively arranged to bear against the respective closed groove end as well as against the respective guide foot.

5. The apparatus of claim 4, wherein the slanting surfaces have a slant angle relative to said saw blade gap plane which angle is within the range of about 45° to about 75°.

6. The apparatus of claim 5, wherein said angle is about 60°.

7. The apparatus of claim 4, wherein said workpiece engaging members carry said workpiece engaging means opposite the respective guide foot, said workpiece engaging means defining a plane extending in parallel to a plane defined by said abutment means.

8. The apparatus of claim 4, wherein said workpiece engaging members comprise stop blocks secured to the respective guide foot, said slanting surfaces having a respective recess as part of said guide groove means to receive the corresponding stop block, said spring means being operatively arranged in the respective recess.

9. The apparatus of claim 4, further comprising guide bar means said spring means being arranged to surround the respective guide bar means.

10. The apparatus of claim 1, wherein said abutment means are centered relative to a plane extending centrally through said cut gap, and wherein said first and second chucking means are arranged mirrorsymmetrically relative to said cut gap.

11. The apparatus of claim 1, wherein said saw is a circular metal saw.

12. The apparatus of claim 1, wherein said abutment member is provided with a saw blade receiving groove of sufficient size to avoid cutting of the abutment member.

* * * * *